A. HALLNER.
CRAB-LEVER SPRING SYSTEM.
APPLICATION FILED OCT. 18, 1915.

1,208,956.

Patented Dec. 19, 1916.
3 SHEETS—SHEET 1.

Inventor
Andrew Hallner

Witness
Ed. R. Lusby by H. B. Willson & Co.
Attorneys

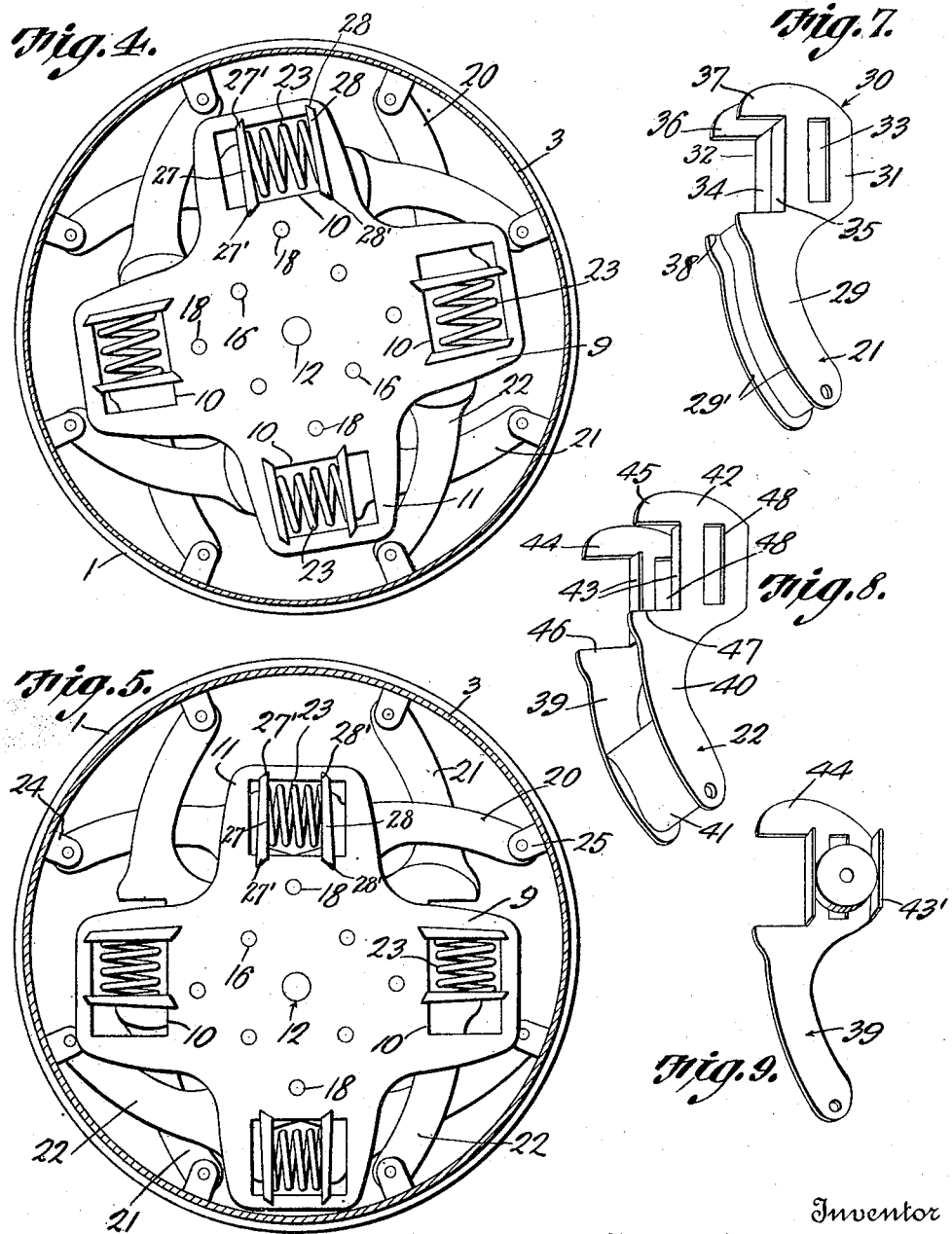

A. HALLNER.
CRAB-LEVER SPRING SYSTEM.
APPLICATION FILED OCT. 18, 1915.
1,208,956.
Patented Dec. 19, 1916.
3 SHEETS—SHEET 3.
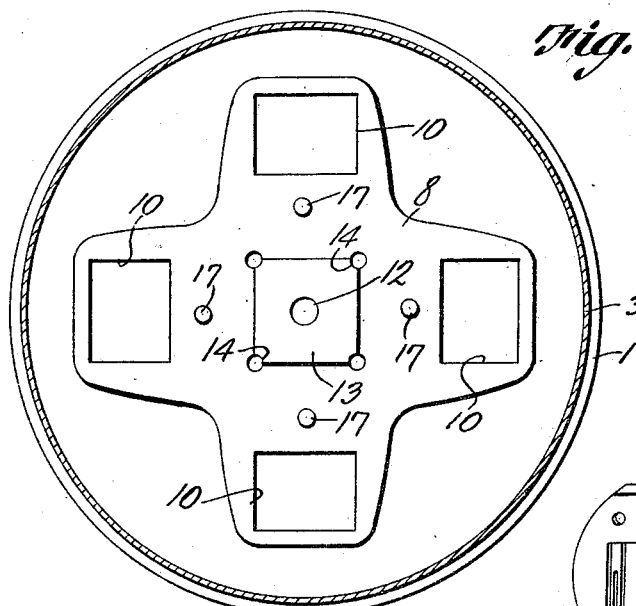
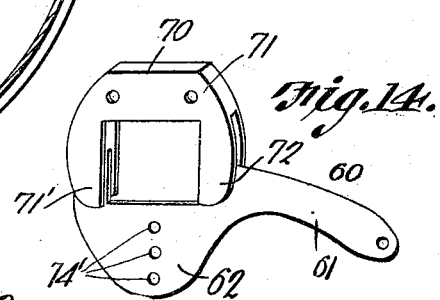
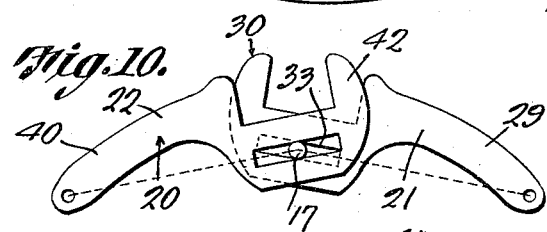
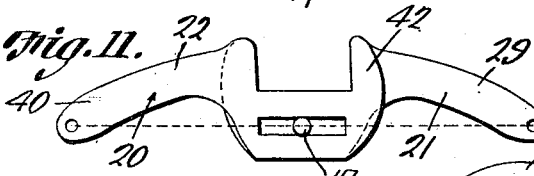
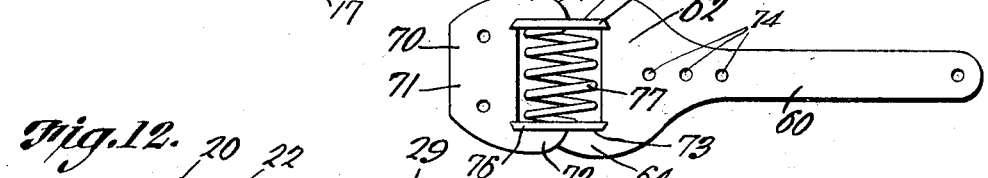
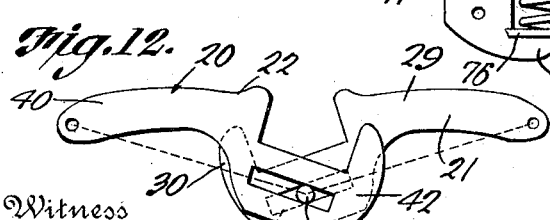
Witness
Ed. R. Lusby
Inventor
Andrew Hallner
by H. B. Willson & Co.
Attorneys

UNITED STATES PATENT OFFICE.

ANDREW HALLNER, OF ARBOGA, CALIFORNIA.

CRAB-LEVER SPRING SYSTEM.

1,208,956.  Specification of Letters Patent.  Patented Dec. 19, 1916.

Application filed October 18, 1915. Serial No. 56,640.

*To all whom it may concern:*

Be it known that I, ANDREW HALLNER, a citizen of the United States, residing at Arboga, in the county of Yuba and State of California, have invented certain new and useful Improvements in Crab-Lever Spring Systems, of which the following is a specification.

This invention relates to improvements in crab lever spring mechanism for transmitting weight, power or force to coil springs for producing oscillating and elastic effects.

The object of the invention is to so construct mechanism of this character that all jars, jerks or irregular impulses will be neutralized, and a continuously even and smooth force will be transmitted for operating delicate machinery.

Another object is to produce mechanism of this character which may be utilized for taking up slacking tendencies in belts and producing a soft uniform tension and tautness thereof as well as being adapted as a substitute for pneumatic tires on vehicle wheels.

Another object is to provide a mechanism of this character which is capable of having simultaneous sagging, oscillating and twisting movements in any direction.

With these and other objects in view, the invention consists of certain novel features of construction, combination and arrangement of parts to be hereinafter more particularly described and claimed.

Figure 1:
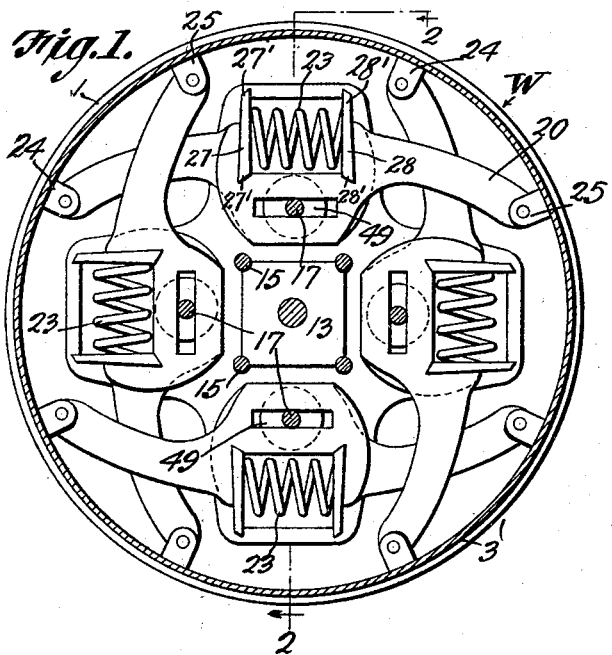
Figure 2:
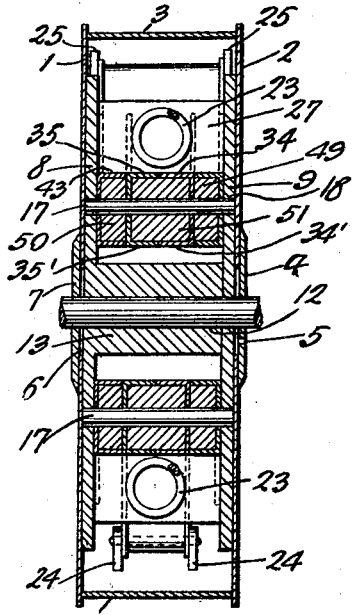
Figure 3:
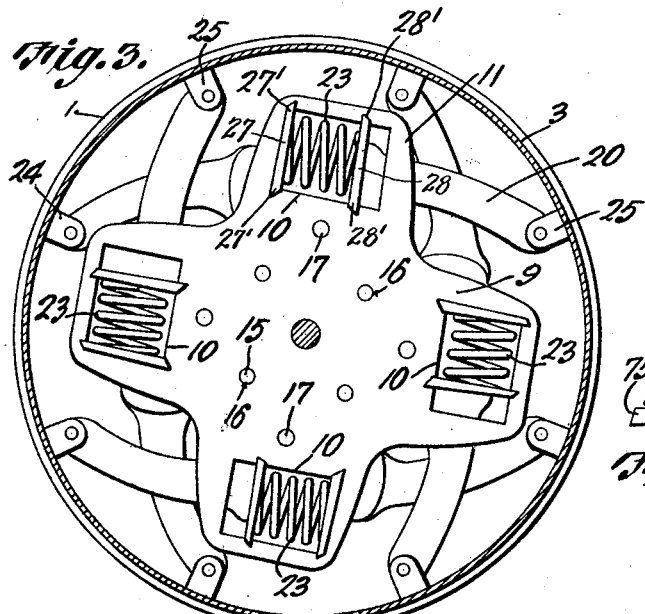
Figure 15:
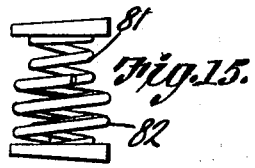
Figure 16:
Figure 17:
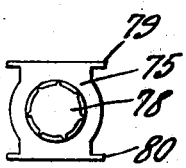

In the accompanying drawings: Figure 1 represents a vertical peripheral section of a wheel constructed in accordance with this invention, with one of the hub plates removed and with the parts in the position assumed when in neutral or rest position; Fig. 2 is a transverse vertical section taken on the line 2—2 of Fig. 1; Fig. 3 is a view similar to Fig. 1 with both hub plates in position and with the parts in the position assumed when a twist from left to right is exerted on the interior mechanism of the wheel; Fig. 4 is a similar view showing the parts in the position assumed when a twist from right to left is exerted on the mechanism; Fig. 5 is a view similar to Fig. 4 with the parts in the position assumed when the hub has been forced from its central position, and when the shell or casing makes an upward stroke; Fig. 6 is a view similar to Fig. 1 showing what may be termed the lower hub plate; Fig. 7 is a perspective view of the male member of the duplex crab lever; Fig. 8 is a similar view of the female member thereof; Fig. 9 is a similar view of one of the elements of the female member; Fig. 10 is a side elevation of one of the duplex crab lever units showing the members thereof bent upward; Fig. 11 is a side elevation of one of the duplex crab lever units with the members thereof in neutral or rest position; Fig. 12 is a similar view with the members bent downward; Fig. 13 is a side elevation of one of the simplex crab lever units with the parts in neutral position; Fig. 14 is a similar view with the spring omitted with the grippers extended at right angles to the neutral position; Fig. 15 is a similar view showing a double coil spring used in connection with this form of the invention; Figs. 16 and 17 are side and front elevations respectively of the guide plates.

In the embodiment illustrated in Figs. 1 to 12 a vehicle wheel W is shown equipped with this improved mechanism, what may be termed the duplex crab lever system being shown in this application of the invention. This wheel W as shown is composed of dust proof disks 1 and 2 with a rim 3 arranged between them and spaced inwardly from the peripheries thereof a sufficient distance to form a seat for a solid tire not shown which may be of any desired material. These disks and rim are joined together in fluid tight relation to form a lubricant containing chamber.

The disk 2 is provided with a central projection 4 having a protected opening 5 for lubrication. The disk 1 has a central opening 6 to permit the free movement of the axle and is provided with a flexible dust and mud guard 7.

Two hub plates 8 and 9 are arranged within the casing formed by the disks 1 and 2 and the rim 3 and are here shown in the form of Greek crosses of the same size and each of which has openings 10 in the arms 11 thereof, said openings being here shown rectangular in form and which are designed for a purpose to be described. Each of these plates has a central axle receiving opening 12 and on the inner face of plate 8 is secured a boss 13 which is of sufficient thickness to properly space the plates 8 and 9 a sufficient distance to permit the free movement between them of the levers hereinafter to be described. This boss 13 is here shown square with semi-circular recesses 14 formed in the four corners thereof which are designed to form seats for bolts 15 which connect the two plates 8 and 9 extending through registering apertures 16 in said plates. A plurality of lever guiding posts 17 extend laterally inward from the face of plate 8, being arranged between the openings 10 in the arms 11 of the plate and the straight side walls of the boss 13 as is shown clearly in Fig. 2. These posts 17 also extend through apertures 18 formed in plate 9.

Mounted between the plates 8 and 9 are a plurality of duplex crab lever spring units 20, four of which are here shown. All of the units being exactly alike one only will be described. Each unit 20 comprises two duplex male and female crab levers 21 and 22, and a coiled spring 23. Two hinge knuckles 24 and 25 connect the outer ends of the levers to the casing or rim, pintles being here shown connecting said lever ends and knuckles. A pair of guide plates 27 and 28 is shown arranged between the jaws of the levers in each opening 10 of the plates 8 and 9 and between said guide plates is arranged a coiled spring 23. The male lever 21 is constructed as shown in Fig. 7 including an arcuate arm 29 having a hollow head 30 formed at one end. This arm 29 has longitudinally extending reinforcing flanges 29' on each edge. The head 30 of the lever 21 as shown is composed of two laterally spaced plates 31 and 32 having longitudinally extending registering slots 33 therein for a purpose to be described. Flanges 34 and 35 extend laterally inward from the upper edges of these plates and the free edges thereof meet and are united midway the width of the head as is shown clearly in Fig. 2. Similar flanges 34' and 35' extend inwardly from the lower edges of the plates between which and the upper flanges 34 and 35 an anti-friction rocking roller 51 to be described, is disposed.

Gripping fingers 36 and 37 rise from the free ends of the plates 31 and 32 and a coöperating gripping shoulder 38 is disposed at the inner end of the head 30 at the junction thereof with the arm 29, said shoulder and fingers forming longitudinally spaced rigid jaws.

The female lever 22 is composed of two arcuate arms 39 and 40 connected at one end by a web 41 which is arranged between them and extends about half way the length thereof with its inner end inclined outwardly to afford ample space for the rocking of the lever 21 between the plates 39 and 40. At the end of each arm 39 and 40 is a head 42 shaped similarly to the head 30 of the lever 21. These heads 42 have inwardly extending lateral flanges 43 at their upper edges and similar flanges 43' at their lower edges which are designed to register transversely with the flanges 34 and 35 and 34' and 35' of the head 30 when the parts are assembled. (See Fig. 2).

Upstanding fingers 44 and 45 at the free ends of the heads 42 are shaped to correspond with the fingers 36 and 37 of lever 21, and said heads have shoulders 46 and 47 at their inner ends which correspond to the shoulder 38 of lever 21. The heads 42 are also provided with longitudinally extending slots 48 which register with the slots 33 in lever 21 when the parts are assembled, and through which one of the guide posts 17 is designed to extend.

Two friction rollers or disks 49 and 50 are arranged on the guide post 17 between the inner faces of the heads 42 of lever 22 and the outer faces of the head 30 of lever 21 and are disposed between the flanges 43 and 43' of said heads 42 to provide for the free movement of the levers relatively to each other without frictional binding. The friction roller 51 is also arranged on the post 17 between the plates 31 and 32 of the head 30 of lever 21, and is of a sufficient thickness to span the space between said plates, and is designed to coöperate with the upper and lower flanges 34, 34' and 35 and 35' carried respectively by the upper and lower edges of the plates 31 and 32 as shown clearly in Fig. 2.

The hinge knuckles 24 and 25 which connect the levers with the rim are spaced at their opposite ends from the opposite sides of the rim a sufficient distance to permit the free and uninterrupted movement of the hub plates 8 and 9 between said knuckle ends and rim edges, as the stability and steadiness of an elastic wheel depends upon the snug and perfect fit of the hinge joint. The levers which extend in opposite directions when the parts are assembled, perform the function also of the spokes of the wheel, and the entire weight or load of the wheel is supported on the springs 23.

From the above description it will be obvious that when the parts of each crab lever units are assembled that the outer ends of the arms thereof will be hingedly connected by the knuckles 24 and 25 with the rim of the wheel at opposite points and in alinement with each other, and that one of the posts 17 will extend through the registering slots 33 and 48 and connect the heads 30 and 42 of the levers, while the guide plates 27 and 28 project through the registering openings 10 in the hub plates 8 and 9 with the coiled springs 23 arranged between said plates and adapted to be compressed or to expand according to the weight or force brought to bear thereon. These plates 27 and 28 have flanges 27' and 28' at their opposite ends, the ends of which extend beyond the side edges of the openings 10 and thus hold the plates against accidental displacement.

In Figs. 1 and 11 the two coöperating levers constituting a single unit are shown at rest or in equilibrium with no pressure brought to bear from either direction thereon and when in this position a line drawn though the guide post 17 which connects the levers of the unit and through the hinge joints at the ends thereof will be rectilinear and the jaws of the levers will be opened to their full extent with the shoulders of one flush with the fingers of the other and with the guide plates 27 and 28 arranged at the opposite ends of the openings 10.

In Fig. 10 the levers 21 and 22 are shown in the position which they assume when upward pressure is exerted on the connected hub plates 8 and 9 between which they are mounted and with which they are connected by the posts 17. This movement causes the posts 17 to move upwardly and thus force the gripping fingers of the levers toward each other and their shoulders away from each other, thereby compressing the spring 23 between them which takes up the shocks occasioned by this movement.

In Figs. 5 and 12 the levers 21 and 22 are shown in the position which they assume when a downward pressure is exerted on said hub plates and in which position the shoulders of the two levers operate as grippers for compressing the spring, the fingers thereof moving away from each other.

When the hub is forced from its central position by some sudden impulse such as a ridge or riffle in the road, causing the casing to make an upward stroke, the shock effects the entire mechanism and transmits pressure equally to all the springs. (See Fig. 5.) A direct upward stroke to the wheel causes the springs at the opposite sides of the wheel to be compressed downwardly by the engagement of the upper end walls of the openings 10 with the guide plates with which they contact, while the springs at the top and bottom of the wheel are compressed by the gripping of the fingers of the crab levers located at these points which are controlled by the guide posts 17 which are engaged with these levers.

In Fig. 3 the parts are shown in the position which they assume when a twist is given from the left to the right, called a forward or progressive twist which is an impulse by power or some force similar to that of starting the machinery. Changing the power or force from right to left is called the backward or reverse twist and the effect upon the mechanism is precisely the same. When this twist is given to the mechanism within the casing, the springs are compressed from the right to the left as shown in Fig. 4.

It will thus be seen that a wheel equipped with this improved crab lever mechanism is capable of sagging, oscillating or twisting simultaneously whether forward or backward, upward or downward, to the right or to the left, at any point going in either direction with the mechanism operating in the same manner whether in the forward or reverse application of power to a steam engine. Hence while the power or force may result from weight or load and be transmitted by the axle and hub to the inner mechanism of the wheel the reverse is effected when riding over a rough road. In this latter case the impulses are derived from the ridges in the road and are transmitted by the rim, knuckles and hinges to the arms of the levers, the guide posts 17 becoming the fulcrums or pivots. Thus it follows that the weight, power or impulse force may proceed as just set forth above from the rim, or the fulcrum, and that the mobility afforded the guide posts in the slots readily, easily and quickly shifts the fulcrum from the center in any degree in either direction, whereby the points of application of the weight are varied, thus varying the effect on the springs to suit conditions and the desires of the operator.

In Figs. 13 to 17 a simplex crab lever in its simplest form is shown in which the lever 60 is the only movable part, the coöperating member 70 being fastened to the vehicle body or other appliance in connection with which the device is to be used. In this form of the invention the member 70 which is designed to be fixed to the apparatus in connection with which the device is to be used comprises a plate 71 having a pair of laterally spaced fingers 71' and 72 extending from each end on one edge thereof, a substantially rectangular spring seat 73 being formed between said pairs of fingers.

The lever 60 has an arcuate arm 61 provided at one end with a head 62 having longitudinally spaced fingers 63 and 64 extending from one edge thereof and which are designed to enter between the pairs of fingers at the ends of the member 70 for closing the spring seat 73. Transversely alined spaced apertures 74 are formed in the head 62 of Fig. 13 and similar apertures 74' in Fig. 14 to adjustably receive a fulcrum or pivot to provide for the adjustment of the spring power according to the weight, power or force exerted. While three of these apertures are shown it is to be understood that any desired number may be employed to meet the necessary adjustments. It is a well known fact that the nearer the weight comes to the fulcrum or the fulcrum to the weight the less power is required to lift the weight and vice versa, and hence by changing the fulcrum of the levers from one of these holes or apertures to another the load effect or pressure on the springs may be regulated. This provision for the adjustability of the fulcrum in combination with the double coil spring shown in Fig. 15 renders this crab lever spring system exceedingly pliable and adaptable to the most delicate movements as well as to any weight or load.

The guide plates 75 and 76 are similar to the plates 27 and 28 of the other figures and between which the cushioning spring 77 is designed to be mounted and compressed thereby. These plates have spring retaining elements 78 which are designed to enter the ends of the coiled springs and hold them against lateral movement. These plates are also provided on their ends with laterally extending flanges 79 and 80, the ends of which project beyond the side edges of the plates and operate to hold the plates against accidental displacement. Two coiled springs as shown in Fig. 15 are preferably employed one being arranged in the other, the inner spring 81 being longer and of less strength than the outer spring 82. The power and tension of these springs is adjusted to the weight or load anticipated to be supported thereby, the inner spring being adjusted to the weight of the vehicle to provide for as soft and easy running empty as when loaded to full capacity. The outer spring 82 operates in conjunction with the inner spring 81 as soon as the weight of the load becomes sufficient to bring said outer spring into operation, resulting in a soft swaying movement similar to the movement of a boat on the gentle ripples of the sea.

I claim:

1. A crab lever spring system including a plurality of units each having a fulcrum and an arm with jaws on each side of said fulcrum, a coil spring arranged between said jaws, said jaws being normally on a neutral or rest line, and means connected to pivot said jaws on their fulcrum, whereby said spring is compressed and shocks absorbed thereby.

2. A crab lever spring system including a plurality of units each having a fulcrum and an arm with jaws on each side of said fulcrum, a coil spring arranged between said jaws, said jaws being normally on a neutral or rest line, and means connected to pivot said jaws in opposite directions on their fulcrum and thereby compress said spring, the resisting power of said spring being the same whichever way the jaws are pivoted.

3. A crab lever spring system including a plurality of duplex units, each comprising a male and a female crab lever having telescoping pivotally connected jaws, a coiled spring arranged between the jaws of the two levers, and means connected to pivot the jaws.

4. A crab lever spring system including a casing, a plurality of lever units mounted therein and each comprising a pair of levers pivoted at one end to said casing with their other ends extending toward each other and having lapping pivotally connected heads, each of said heads having longitudinally spaced gripping elements extending laterally in the same direction, the elements of one head alining transversely with those of the other when the parts are in normal position, and shock absorbing elements arranged between the gripping elements of said heads.

5. The combination of an axle, a cylindrical casing loosely mounted thereon, spaced hub plates mounted on said axle in said casing and having registering openings, means for holding said plates in spaced relation, crab lever units mounted between said plates and pivotally connected with said casing, said units having gripping jaws with coiled springs mounted between them to absorb shocks imparted to the axle or casing, and connectors between said lever jaws and plates.

6. The combination of an axle, a cylindrical casing loosely mounted thereon, spaced hub plates mounted on said axle in said casing and having registering openings, means for holding said plates in spaced relation, crab lever units mounted between said plates and pivotally connected with said casing, said units having gripping jaws, coiled springs mounted between the jaws to absorb shocks imparted to the axle or casing, and plates arranged between said jaws and springs and extending into the openings of said hub plates whereby the levers and hub plates are connected.

7. The combination of an axle, a cylindrical casing loosely mounted thereon, spaced hub plates mounted on said axle in said casing and having registering openings, means for holding said plates in spaced relation, crab lever units mounted between said plates and having oppositely extending arms pivotally connected at their outer ends to said casing at points in alinement with each other, said arms having pivotally connected heads at their inner ends, said heads each having spaced gripping elements, those of one head alining laterally with those of the other when in normal position, and a coiled spring mounted between the gripping elements of the two heads.

8. The combination of an axle, a cylindrical casing loosely mounted thereon, spaced hub plates mounted on said axle in said casing and having registering openings, means for holding said plates in spaced relation, crab lever units mounted between said plates and having oppositely extending arms pivotally connected at their outer ends to said casing at points in alinement with each other and provided with heads on their inner ends having longitudinally extending registering slots therein, posts connecting said hub plates and each extending through the slots in the heads of a lever unit forming a pivot therefor, said heads having coöperating gripping elements, and a coiled spring arranged between the gripping elements of the two heads.

9. A lever unit for a duplex crab lever spring system comprising a pair of longitudinally alined levers having telescoping longitudinally slotted heads with laterally extending longitudinally spaced gripping elements, pivots extending through the slots in said heads, and a coiled spring arranged between the gripping elements of the two heads.

10. A duplex crab lever unit comprising a male and a female lever with a shock absorbing element arranged between them, said levers being connected for longitudinal and lateral movement.

11. The combination of an axle, a cylindrical casing loosely mounted thereon, hub plates mounted on said axle inside said casing, a spacing sleeve carried by one of said plates and engaging the other, a plurality of posts spaced radially from said axle and connecting said plates, a plurality of crab lever units mounted in said casing between said plates and engaged with said posts, said units comprising levers pivotally connected at one end, and their opposite ends pivoted to the inner peripheral wall of said casing, said levers having jaws on their pivotally connected ends, and coiled springs arranged between said jaws.

12. The combination of an axle, a casing loosely mounted thereon, a plurality of duplex crab lever units pivoted at opposite ends to the peripheral wall of said casing, each unit being composed of two members pivoted to move in opposite directions and to have a twisting movement, and cushioning elements disposed between the pivotally connected ends of said members.

ANDREW HALLNER.

Witnesses:
R. N. HALLNER,
EDWIN LARSON.

Copies of this patent may be obtained for five cents each, by addressing the "Commissioner of Patents, Washington, D. C."